United States Patent
Kim et al.

(10) Patent No.: US 12,338,350 B2
(45) Date of Patent: Jun. 24, 2025

(54) COPPER SULFIDE NANOPARTICLES HAVING CORE-SHELL STRUCTURE INCLUDED IN COATING COMPOSITION FOR BLOCKING NEAR-INFRARED LIGHT, AND PREPARATION METHOD THEREFOR

(71) Applicant: AMTE CO., LTD, Chungcheongnam-do (KR)

(72) Inventors: Nam Hoon Kim, Ansan-si (KR); Byung Kwon Jang, Ansan-si (KR)

(73) Assignee: AMTE CO., LTD, Yesan-gun (KR)

( * ) Notice: Subject to any disclaimer, the term of this patent is extended or adjusted under 35 U.S.C. 154(b) by 0 days.

(21) Appl. No.: 18/671,951

(22) Filed: May 22, 2024

(65) Prior Publication Data
US 2024/0309212 A1    Sep. 19, 2024

Related U.S. Application Data (62) Division of application No. 17/281,292, filed as application No. PCT/KR2019/011974 on Sep. 17, 2019, now Pat. No. 12,024,634.

(30) Foreign Application Priority Data

Oct. 1, 2018  (KR) ................. 10-2018-0116980

(51) Int. Cl.
*C09C 1/00*     (2006.01)
*C08K 3/30*     (2006.01)
(Continued)

(52) U.S. Cl.
CPC ............... *C09C 1/00* (2013.01); *C09C 3/063* (2013.01); *C09D 7/62* (2018.01); *C09D 7/67* (2018.01);
(Continued)

(58) Field of Classification Search
CPC .. C09C 1/00; C09C 3/063; C09D 7/62; C09D 7/67; C09D 7/68; C01P 2002/72;
(Continued)

(56) References Cited

U.S. PATENT DOCUMENTS

| 7,651,674 B2 | 1/2010 | Jun | |
| 2017/0186909 A1* | 6/2017 | Kim | ........... H01L 33/06 |
| 2018/0171159 A1* | 6/2018 | Ooi | ........... C08K 3/08 |

FOREIGN PATENT DOCUMENTS

| JP | 2005-325016 A | 11/2005 |
| JP | 2006-010759 A | 1/2006 |

(Continued)

OTHER PUBLICATIONS

Aso Navaee a, Abdollah Salimi, Sulfur doped-copper oxide nanoclusters synthesized through a facile electroplating process assisted by thiourea for selective photoelectrocatalytic reduction of CO2, Journal of Colloid and Interface Science 505 (2017) 241-252. (Year: 2017).*

(Continued)

*Primary Examiner* — Bijan Ahvazi
(74) *Attorney, Agent, or Firm* — Sughrue Mion, PLLC (57) ABSTRACT

Proposed are copper sulfide nanoparticles having a core-shell structure included in a coating composition for blocking near-infrared light, and a method of manufacturing the same. More particularly, a method of manufacturing copper sulfide nanoparticles having a core-shell structure includes manufacturing CuS nanoparticles, manufacturing $Cu_{2-x}S$ nanoparticles by heating a mixed solution of the CuS nanoparticles, a reducing agent, and a solvent, and manufacturing $Cu_{2-x}S@Cu_{2-y}O$ core-shell nanoparticles by heating a mixed solution of the $Cu_{2-x}S$ nanoparticles, an oxidizing agent, and a solvent.

1 Claim, 5 Drawing Sheets

(51) Int. Cl.
  *C08K 9/02* (2006.01)
  *C09C 3/06* (2006.01)
  *C09D 7/40* (2018.01)
  *C09D 7/62* (2018.01)
(52) U.S. Cl.
  CPC ............ *C09D 7/68* (2018.01); *C01P 2002/72* (2013.01); *C01P 2004/04* (2013.01); *C01P 2004/62* (2013.01); *C01P 2004/64* (2013.01); *C08K 2003/3009* (2013.01); *C08K 9/02* (2013.01)
(58) Field of Classification Search
  CPC .............. C01P 2004/04; C01P 2004/62; C01P 2004/64; C08K 9/02; C08K 2003/3009
  See application file for complete search history.

(56) References Cited

FOREIGN PATENT DOCUMENTS

| KR | 10-2015-0101802 A | 10/2005 |
|---|---|---|
| KR | 10-0791931 B1 | 1/2008 |
| KR | 10-1505418 B1 | 3/2015 |
| KR | 10-2017-0040470 A | 4/2017 |
| KR | 10-2017-0116389 A | 10/2017 |
| KR | 10-1821489 B1 | 3/2018 |
| KR | 10-1977347 B1 | 5/2019 |

OTHER PUBLICATIONS

Aso Navaee et al., "Sulfur doped-copper oxide nanoclusters synthesized through a facile electroplating process assisted by thiourea for selective photoelectrocatalytic reduction of CO2", Journal of Colloid and Interface Science, 2017, vol. 505, pp. 241-252 (14 pages total).

International Search Report of PCT/KR2019/011974 dated Dec. 26, 2019 [PCT/ISA/210].

Office Action issued Mar. 22, 2022 in Japanese Application No. 2021-543105.

Aso Navaee, Abdollah Salimi, Sulfur doped-copper oxide nanoclusters synthesized through a facileelectroplating process assisted by thiourea for selective photoelectrocatalytic reduction of CO2, Journal of Colloid and Interface Science 505 (2017) 241-252 (Year: 2017).

Rui Ma, John Stegemeier, Clement Levard, James G. Dale, Clinton W. Noack, Tiffany Yang, Gordon E. BrownJr and Gregory V. Lowry, Sulfidation of copper oxide nanoparticles and properties of resulting copper sulfide, Environ. Sci.: This journal is @ The Royal Society of Chemistry 2014 Nano, 2014, 1,347-357 (Year: 2014).

Yuan-Tse Kao, Shu-Meng Yang and Kuo-Chang Lu, Synthesis and Photocatalytic Properties of CuO-CuS Core-Shell Nanowires, Materials 2019, 12, 1106, 1-11 (Year: 2019).

* cited by examiner

COPPER SULFIDE NANOPARTICLES HAVING CORE-SHELL STRUCTURE INCLUDED IN COATING COMPOSITION FOR BLOCKING NEAR-INFRARED LIGHT, AND PREPARATION METHOD THEREFOR

TECHNICAL FIELD

This application is a Rule 53(b) Divisional of U.S. Application Ser. No. 17/281,292, filed Mar. 30, 2021, which is a National Stage of International Application No. PCT/KR2019/011974, filed Sep. 17, 2019, claiming priority to Korean Patent Application No. 10-2018-0116980, filed Oct. 1, 2018, the entire disclosures of which are incorporated herein by reference.

The present disclosure relates to copper sulfide nanoparticles having a core-shell structure as a material having a near-infrared blocking function included in a coating composition for blocking near-infrared light and a method of manufacturing the same, and more particularly to copper sulfide nanoparticles having a core-shell structure, which are capable of exhibiting superior stability in water while maintaining the near-infrared blocking function of existing copper sulfide nanoparticles, and a method of manufacturing the same.

BACKGROUND ART

Recently, as the area of glass windows has increased significantly in order to improve the aesthetics, scenery and solar illumination of buildings, problems such as increased indoor temperature due to solar radiation in the summer and decreased heating efficiency in the winter have occurred, and account for 60% or more of the total energy loss from buildings.

Conventionally, awning devices (blinds, vertical blinds, curtains, etc.) have been used to mitigate the inflow and outflow of energy, but they are infrequently used due to the inconvenience and poor aesthetics thereof. Moreover, the importance of energy savings has emerged and thus environmental regulations have become more stringent around the world in order to solve the problem of global warming, so even more energy saving measures are required for buildings.

In order to meet these requirements, it is necessary to develop energy-saving, highly functional thermal barrier films for buildings, and the market is greatly developed with a rapid increase in the demand therefor.

The properties of thermal barrier films are imparted by thermal barrier additives, and various materials are used as the thermal barrier additives.

Specifically, dyes and organic additives are of limited usefulness due to the poor stability thereof and absorption of infrared light in a narrow range. Also, a heat-reflective film, obtained by forming a metal thin film through sputtering or deposition, has been introduced, but in spite of the excellent infrared blocking performance thereof, there are disadvantages such as low visible-light transmittance, a high unit cost, and electromagnetic-wave-blocking properties.

Doped tungsten oxide nanoparticles (e.g. cesium tungsten oxide) and doped tin oxide nanoparticles (e.g. indium tin oxide, antimony tin oxide) have been most often used as thermal barrier additives in recent years. The oxide nanoparticle additive described above is the most suitable material for thermal barrier films for buildings by virtue of the high visible-light transmittance, high infrared cut, and high thermal and chemical stability, but is problematic because of the high unit cost due to the inclusion of rare elements, complex synthesis and firing processes, and poor dispersibility. Hence, it is necessary to develop replacement materials therefor.

As disclosed in Korean Patent No. 1821489, a near-infrared blocking coating composition using copper sulfide nanoparticles having high visible-light transmittance and high infrared cut is developed to replace oxide nanoparticles. However, copper sulfide is problematic in that, when in contact with water, copper sulfide crystals are decomposed by water, so the infrared blocking properties cannot be maintained continuously. Due to this problem, copper sulfide is currently not commercially available as a near-infrared blocking agent, and accordingly, there is a need to develop a copper sulfide material that is superior in water resistance, that is, is more stable in water.

CITATION LIST

Patent Literature (Patent Document 0001) Korean Patent No. 10-0791931 (Title: Diimmonium salt and near-infrared absorption film containing the same, Applicant: SK Chemicals, Registration date: Dec. 28, 2007)

(Patent Document 0002) Korean Patent No. 10-1505418 (Title: Transparent thermal-barrier coating solution composition having improved near-infrared cut, method of manufacturing the composition, transparent thermal-barrier film and glass manufactured using the composition, Applicant: AMTE Co. Ltd., Registration date: Mar. 18, 2015)

(Patent Document 0003) Korean Patent No. 10-1821489 (Title: Coating solution composition containing copper sulfide nanoparticles for selectively blocking near-infrared light, Applicant: AMTE Co. Ltd., Registration date: Jan. 17, 2018)

DISCLOSURE

Technical Problem

An objective of the present disclosure is to provide copper sulfide nanoparticles having a core-shell structure, which are capable of exhibiting improved stability in water while maintaining the superior visible-light transmittance and infrared cut of copper sulfide nanoparticles, by forming a dense copper oxide shell through reduction and oxidation of copper sulfide nanoparticles as a material having a near-infrared blocking function in a coating composition for blocking near-infrared light, and a method of manufacturing the same.

Technical Solution

According to the present disclosure, copper sulfide nanoparticles having a core-shell structure are manufactured in a manner in which CuS nanoparticles are manufactured and the manufactured CuS nanoparticles are reduced to obtain $Cu_{2-x}S$ nanoparticles, which are then oxidized, so the surface of $Cu_{2-x}S$ is converted into copper oxide. During the conversion of the surface of $Cu_{2-x}S$ into copper oxide, a dense copper oxide film may be formed, thus manufacturing copper-sulfide-based nanoparticles having superior stability in water when in contact with water.

According to a general embodiment, a method of manufacturing copper sulfide nanoparticles having a core-shell structure includes manufacturing CuS nanoparticles, manufacturing Cu$_{2-x}$S nanoparticles by placing the CuS nanoparticles, a reducing agent and a solvent in a reactor and performing heating, purifying the Cu$_{2-x}$S nanoparticles, manufacturing Cu$_{2-x}$S@Cu$_{2-x}$O core-shell nanoparticles by placing the purified Cu$_{2-x}$S nanoparticles, an oxidizing agent and a solvent in a reactor and performing heating, and purifying the Cu$_{2-x}$S@Cu$_{2-y}$O core-shell nanoparticles.

The CuS nanoparticles may be manufactured by mixing 0.1 to 0.5 mol of a copper precursor and 0.1 to 0.5 mol of thiourea with a polyol solvent and carrying out a reaction at 90 to 100° C. for 30 to 150 minutes.

The polyol is a polyhydric alcohol that functions to reduce a copper compound. A polyol having 2 to 6 OH groups is preferably used, and for example, at least one selected from among ethylene glycol, diethylene glycol, triethylene glycol, tetraethylene glycol, propylene glycol, trimethylene glycol, polyethylene glycol, and phenyl diglycol may be used.

0.1 to 0.5 mol of the copper precursor or thiourea may be used by being dissolved in 25-150 ml of ethylene glycol or diethylene glycol.

Here, the mixing ratio of the copper precursor and the thiourea, the reaction temperature, and the reaction time are optimized for conditions for manufacturing the copper sulfide nanoparticles. Outside these conditions, near-infrared light may not be blocked well, so the quality of the coating solution composition may be deteriorated. The copper precursor may be at least one selected from the group consisting of copper nitrate, copper chloride, copper acetate, and copper alkoxide, and is preferably copper (Cu) nitrate. Accordingly, the copper sulfide nanoparticles are preferably manufactured using copper nitrate as a starting material through a glycothermal process.

The copper sulfide nanoparticles have a primary particle size of 5 nm to 200 nm and satisfy a Cu/S element ratio of 1 to 2.

The reducing agent may include at least one selected from the group consisting of lithium aluminum hydride, diisobutyl aluminum hydride, diborane, lithium borohydride, sodium borohydride, potassium borohydride, formic acid, formaldehyde, acetaldehyde, propyl aldehyde, butyl aldehyde, hexyl aldehyde, decyl aldehyde, dodecyl aldehyde, hexadecyl aldehyde, octadecyl aldehyde, hydrogen sulfide, mercaptomethane, mercaptoethane, mercaptopropane, mercaptobutane, mercaptohexane, mercaptooctane, mercaptodecane, mercaptododecane, mercaptohexadecane, mercaptooctadecane, mercaptomethanol, mercaptoethanol, mercaptopropanol, mercaptobutanol, mercaptohexanol, mercaptooctanol, mercaptodecanol, mercaptododecanol, mercaptohexadecanol, mercaptooctadecanol, mercaptoacetic acid, mercaptopropionic acid, mercaptobutyric acid, mercaptohexanoic acid, mercaptooctanoic acid, mercaptodecanoic acid, mercaptododecanoic acid, mercaptohexanoic acid, mercaptooctanoic acid, mercaptomethylamine, mercaptoethylamine, mercaptopropylamine, mercaptobutylamine, mercaptohexylamine, mercaptooctylamine, mercaptodecylamine, mercaptododecylamine, mercaptohexadecylamine, mercaptooctadecylamine, dimercaptomethane, dimercaptoethane, dimercaptopropane, dimercaptobutane, dimercaptohexane, dimercaptooctane, dimercaptodecane, dimercaptododecane, dimercaptohexadecane, dimercaptooctadecane, cysteine, mercaptopyruvic acid, mercaptosuccinic acid, mercaptomaleic acid, sodium, potassium, lithium, metal amalgam, hydrogen ascorbate, methane, ammonia, carbon monoxide, sodium hydride, lithium hydride, potassium hydride, lithium diisopropyl amine, potassium ethoxide, sodium ethoxide, and lithium ethoxide.

The oxidizing agent may include at least one selected from the group consisting of hydrogen oxide, lithium hydroxide, sodium hydroxide, potassium hydroxide, hydrogen peroxide, benzoyl peroxide, dicumyl peroxide, lauroyl peroxide, tert-butyl peroxide, cyclohexanone peroxide, 2,4-pentanedione peroxide, peracetic acid, cumene hydroperoxide, tert-butyl peroxybenzoate, tert-butyl peracetate, tert-butyl hydroperoxide, hydrogen persulfate, lithium persulfate, sodium persulfate, potassium persulfate, ammonium persulfate, hydrogen permanganate, lithium permanganate, sodium permanganate, potassium permanganate, ammonium permanganate, hydrogen manganate, lithium manganate, sodium manganate, potassium manganate, ammonium manganate, hydrogen dichromate, lithium dichromate, sodium dichromate, potassium dichromate, ammonium dichromate, hydrogen chromate, lithium chromate, sodium chromate, potassium chromate, ammonium chromate, hydrogen periodate, lithium periodate, sodium periodate, potassium periodate, hydrogen iodate, lithium iodate, sodium iodate, potassium iodate, hydrogen iodite, lithium iodite, sodium iodite, potassium iodite, hydrogen hypoiodite, lithium hypoiodite, sodium hypoiodite, potassium hypoiodite, hydrogen perbromate, lithium perbromate, sodium perbromate, potassium perbromate, hydrogen bromate, lithium bromate, sodium bromate, potassium bromate, hydrogen bromite, lithium bromite, sodium bromite, potassium bromite, hydrogen hypobromite, lithium hypobromite, sodium hypobromite, potassium hypobromite, hydrogen perchlorate, lithium perchlorate, sodium perchlorate, potassium perchlorate, hydrogen chlorate, lithium chlorate, sodium chlorate, potassium chlorate, hydrogen chlorite, lithium chlorite, sodium chlorite, potassium chlorite, hydrogen hypochlorite, lithium hypochlorite, sodium hypochlorite, potassium hypochlorite, oxygen, ozone, and nitric acid.

The solvent may include at least one selected from the group consisting of water, methanol, ethanol, isopropanol, butanol, acetone, methyl ethyl ketone, methyl isobutyl ketone, acetylacetone, formic acid, acetic acid, formaldehyde, acetaldehyde, methyl acetate, ethyl acetate, butyl acetate, toluene, xylene, benzene, chlorobenzene, dichlorobenzene, trichlorobenzene, pyridine, hexene, cyclohexene, octane, isophorone, dioxane, tetrahydrofuran, chloroform, dichloromethane, carbon tetrachloride, dichloroethane, diethyl ether, N,N-dimethylformamide, N,N-dimethylacetamide, N-methylpyrrolidone, formamide, dimethylsulfoxide, acetonitrile, propylene carbonate, ethylene glycol, ethylene glycol monobutyl ether, ethylene glycol monobutyl ether acetate, ethylene glycol monoethyl ether, ethylene glycol monoethyl ether acetate, diethylene glycol, diethylene glycol monobutyl ether, diethylene glycol monobutyl ether acetate, diethylene glycol monoethyl ether, diethylene glycol monoethyl ether acetate, polyethylene glycol, propylene glycol, propylene glycol monobutyl ether, propylene glycol monobutyl ether acetate, propylene glycol monoethyl ether, propylene glycol monoethyl ether acetate, dipropylene glycol, dipropylene glycol monobutyl ether, dipropylene glycol monobutyl ether acetate, dipropylene glycol monoethyl ether, dipropylene glycol monoethyl ether acetate, and polypropylene glycol.

The core of the copper sulfide nanoparticles having the core-shell structure may be represented by Chemical Formula 1 below.

$$Cu_{2-x}S \quad \text{[Chemical Formula 1]}$$

In Chemical Formula 1, 0≤x≤1.0.

The shell of the copper sulfide nanoparticles having the core-shell structure may be represented by Chemical Formula 2.

$$Cu_{2-y}O \qquad \text{[Chemical Formula 2]}$$

In Chemical Formula 2, $0 \leq y \leq 1.0$.

The blocking wavelength of the copper sulfide nanoparticles having the core-shell structure may fall in the range of 600 nm to 2,500 nm.

The copper sulfide nanoparticles having the core-shell structure may be mixed with a resin binder and an organic solvent to provide a coating composition for blocking near-infrared light. More specifically, the coating composition may include 100 parts by weight of the copper sulfide nanoparticles having the core-shell structure, 20-800 parts by weight of the resin binder, and 100-1000 parts by weight of the organic solvent.

When the coating composition is applied to a thickness of 0.1 μm to 100 μm on a PET film, a near-infrared cut is 50% to 99%, a visible-light transmittance is 30% to 95%, and changes in the infrared cut and the visible-light transmittance even after 100 hours under constant-temperature and constant-humidity (temperature: 85° C., relative humidity: 85%) conditions fall within the range of ±3.0%.

The resin binder may include 100 parts by weight of a UV-curable resin, 10-100 parts by weight of at least one compound selected from among 1,6-hexanediol diacrylate and hydroxypropyl acrylate, and 0.1-20 parts by weight of a photoinitiator for inducing UV polymerization. The photoinitiator may include, for example, 1-hydroxycyclohexylphenylketone (Irgacure 184, Ciba Specialty Chemicals) or the like. The resin binder is preferably configured such that the mixing ratio of the UV-curable resin, 1,6-hexanediol diacrylate and hydroxypropyl acrylate, and the photoinitiator falls within the above range in order to maintain the properties of the coating solution composition.

The UV-curable resin may be at least one selected from the group consisting of a multifunctional monomer, polyester acrylate, epoxy acrylate, and urethane acrylate.

The multifunctional monomer may be at least one selected from the group consisting of dipentaerythritol hexaacrylate, dipentaerythritol hydroxy pentaacrylate, dipentaerythritol tetramethacrylate, propoxylated glycerol triacrylate, trimethylenepropyl triacrylate, trimethylolethane trimethacrylate, trimethylpropane ethoxy triacrylate, and 1,2,3-cyclohexane tetramethacrylate. Preferably, the multifunctional monomer is selected from among dipentaerythritol hexaacrylate and trimethylenepropyl triacrylate.

The organic solvent for use in the preparation of the coating solution according to the present disclosure may be used by appropriately mixing at least one material selected from among alcohols such as methanol, ethanol, isopropanol, butanol, octanol, etc., ketones such as methyl ethyl ketone, methyl isobutyl ketone, cyclohexanone, acetone, diacetone alcohol, etc., polyhydric alcohols such as ethylene glycol monomethyl ether, diethylene glycol monobutyl ether, etc., ethers, esters such as methyl acetate, ethyl acetate, propylene glycol monomethyl ether acetate, propylene glycol monoethyl ether acetate, etc., aromatic hydrocarbons such as benzene, toluene, xylene, etc., dimethylformamide, dimethylacetamide, and N-methylpyrrolidone, depending on the solubility, viscosity, and coating conditions of the composition.

The coating solution composition of the present disclosure may further include a silicon-based additive, a fluorine-based additive, an acrylic additive, and the like to improve surface leveling, slipperiness, antifouling properties, etc.

In another aspect, the present disclosure may provide a thermal barrier film manufactured by applying the coating solution composition on a substrate film and performing UV curing. The substrate film is preferably a polyethylene terephthalate (PET) film or a polypropylene film. Preferably, a polyethylene terephthalate film is used. The thermal barrier film thus manufactured exhibits not only high visible-light transmittance, but also uniform thermal barrier performance throughout the entire infrared range.

Advantageous Effects

According to the present disclosure, there are provided copper sulfide nanoparticles having a core-shell structure as a coating material for a film for blocking near-infrared light, and a method of manufacturing the same. Here, copper sulfide nanoparticles having a core-shell structure can be obtained by reducing CuS nanoparticles to synthesize $Cu_{2-x}S$ nanoparticles, which are then oxidized so that the surface of $Cu_{2-x}S$ is converted into copper oxide to afford a dense copper oxide film, thereby maintaining the superior visible-light transmittance and infrared cut of existing copper sulfide nanoparticles and exhibiting improved stability in water even when used for a long time.

MODE FOR DISCLOSURE

Hereinafter, preferred embodiments of the present disclosure will be described in detail. However, the present disclosure may be embodied in other forms, rather than being limited to the embodiments described herein. Rather, the present disclosure is provided to sufficiently transfer the spirit of the present disclosure to those skilled in the art such that the content disclosed herein is thorough and complete.

Preparation Example 1. Manufacture of CuS Nanoparticles 50 ml of a solution of 4 M copper nitrate in ethylene glycol and 50 ml of a solution of 4 M thiourea in ethylene glycol were mixed and heated at 100° C. for 1 hour with stirring, thus synthesizing CuS nanoparticles. Thereafter, the reaction mixture was cooled to room temperature, centrifuged, washed three times with ethanol and then dried at 60°° C., thereby manufacturing a CuS nanoparticle powder.

Based on the results of X-ray diffraction (XRD) analysis of the CuS nanoparticles thus manufactured, it was confirmed that only the CuS crystal peak appeared.

Based on the results of measurement of the particle size using a transmission electron microscope, it was confirmed that the primary particle size fell in the range of 5-200 nm.

Example 1. Manufacture of $Cu_{2-x}S$ Nanoparticles 10 g of the CuS nanoparticle powder manufactured in Preparation Example above, 2 g of ascorbic acid, and 88 g of ethanol (ethyl alcohol) were placed in a 250 ml round-bottom flask, after which the internal temperature of the flask was raised to 80° C., followed by stirring for 12 hours, thus synthesizing $Cu_{2-x}S$ nanoparticles. Thereafter, the reaction mixture was cooled to room temperature, centrifuged, washed three times with ethanol and then dried at 60° C., thereby manufacturing a $Cu_{2-x}S$ nanoparticle powder.

Based on the results of XRD analysis of the $Cu_{2-x}S$ nanoparticles thus manufactured, the same peak as that of a CuS crystal was observed, and simultaneously, the same peak as a $Cu_{1.8}S$ crystal was also observed, indicating that the $Cu_{2-x}S$ nanoparticles were formed by reducing the CuS nanoparticles.

Example 2. Manufacture of $Cu_{2-x}S@Cu_{2-y}O$ Nanoparticles from $Cu_{2-x}S$ Nanoparticles 10 g of the $Cu_{2-x}S$ nanoparticle powder manufactured in Example 1, 1 g of benzoyl peroxide, and 89 g of ethanol (ethyl alcohol) were placed in a 250 ml round-bottom flask and then stirred at room temperature for 12 hours, thus synthesizing $Cu_{2-x}S@Cu_{2-y}O$ nanoparticles from the $Cu_{2-x}S$ nanoparticles. Thereafter, the reaction mixture was cooled to room temperature, centrifuged, washed three times with ethanol and then dried at 60° C., thereby manufacturing a $Cu_{2-x}S@Cu_{2-y}O$ nanoparticle powder from the $Cu_{2-x}S$ nanoparticles.

Based on the results of XRD analysis of the $Cu_{2-x}S@Cu_{2-y}O$ nanoparticles thus manufactured, the same peak as that of a CuS crystal was observed, and simultaneously, the same peak as that of a $Cu_{1.8}S$ crystal was also observed. In addition, the peak of a $Cu_2O$ crystal was observed at the time of a decrease in the peak intensity of the $Cu_{1.8}S$ crystal, indicating that $Cu_2O$ was formed by oxidizing the surface of the $Cu_{1.8}S$ nanoparticles.

Comparative Example 1. Manufacture of $CuS@Cu_{2-y}O$ Nanoparticles from CuS Nanoparticles 10 g of the CuS nanoparticle powder manufactured in Preparation Example above, 1 g of benzoyl peroxide, and 89 g of ethanol (ethyl alcohol) were placed in a 250 ml round-bottom flask and then stirred at room temperature for 12 hours, thus synthesizing $CuS@Cu_{2-y}O$ nanoparticles from the CuS nanoparticles. Thereafter, the reaction mixture was cooled to room temperature, centrifuged, washed three times with ethanol and then dried at 60° C., thereby manufacturing a $CuS@Cu_{2-y}O$ nanoparticle powder from the CuS nanoparticles.

The copper sulfide nanoparticles manufactured in Preparation Example 1, Example 1, Example 2, and Comparative Example 1 were subjected to energy-dispersive X-ray spectroscopy (EDAX). Based on the results thereof, the element ratio is shown in Table 1 below.

TABLE 1

Element ratio of nanoparticles analyzed through EDAX

| | Cu | S | O |
|---|---|---|---|
| CuS nanoparticles (Preparation Example 1) | 1.00 | 0.97 | 0.11 |
| $Cu_{2-x}S$ nanoparticles (Example 1) | 1.00 | 0.75 | 0.09 |
| $Cu_{2-x}S@Cu_{2-y}O$ nanoparticles synthesized from $Cu_{2-x}S$ nanoparticles (Example 2) | 1.00 | 0.82 | 0.27 |
| $CuS@Cu_{2-y}O$ nanoparticles synthesized from CuS nanoparticles (Comparative Example 1) | 1.00 | 0.92 | 0.53 |

As is apparent from Table 1, compared to CuS manufactured in Preparation Example 1, in the copper sulfide of Example 1, obtained by reducing CuS, the ratio of Cu to S was lowered, and in the copper sulfide of Example 2, obtained through oxidation, the ratio of Cu to S was increased, and the O ratio was also increased, based on which it was confirmed that copper sulfide nanoparticles having a $Cu_{2-x}S@Cu_{2-y}O$ core-shell structure were ultimately manufactured by reducing the Cus nanoparticles into $Cu_{2-x}S$, followed by oxidation.

In Comparative Example 1, in which CuS nanoparticles were not reduced but were only oxidized, the O ratio was increased, based on which it was confirmed that copper sulfide nanoparticles having a $CuS@Cu_{2-y}O$ core-shell structure were manufactured.

Test Example 1. Transmittance and Stability of Copper Sulfide Nanoparticles

Preparation of Nanoparticle Suspension 10 g of the copper sulfide nanoparticle powder manufactured in each of Preparation Example 1, Example 1, Example 2, and Comparative Example 1, 10 g of DISPERBYK-116, 80 g of methyl isobutyl ketone (MIBK), and 50 g of zirconia balls (500 μm) were added and dispersed for 14 days using a ball-mill disperser. Thereafter, zirconia balls and foreign substances were removed using a PP filter (300 mesh), thereby manufacturing a nanoparticle suspension. In addition, the size distribution of the copper sulfide nanoparticles was confirmed using a nanoparticle size analyzer (Zetasizer, Nano ZS90).

Preparation of Nanoparticle Coating Solution 23.9 g of dipentaerythritol hexaacrylate (DPHA), 4.7 g of isobornyl (meth) acrylate (IBOA), 60.9 g of pentaerythritol triacrylate (PEPTA), and 5.5 g of 1-hydroxycyclohexylphenylketone were placed in a 250 ml flask and stirred for 1 hour using a motor stirrer, thereby preparing a binder. The binder thus prepared and the nanoparticle suspension prepared above were mixed at a weight ratio of 1:2. Thereafter, a coating solution including the nanoparticles was manufactured through stirring for 30 minutes using a stirrer.

Manufacture of Film including Nanoparticles

Figure 1:
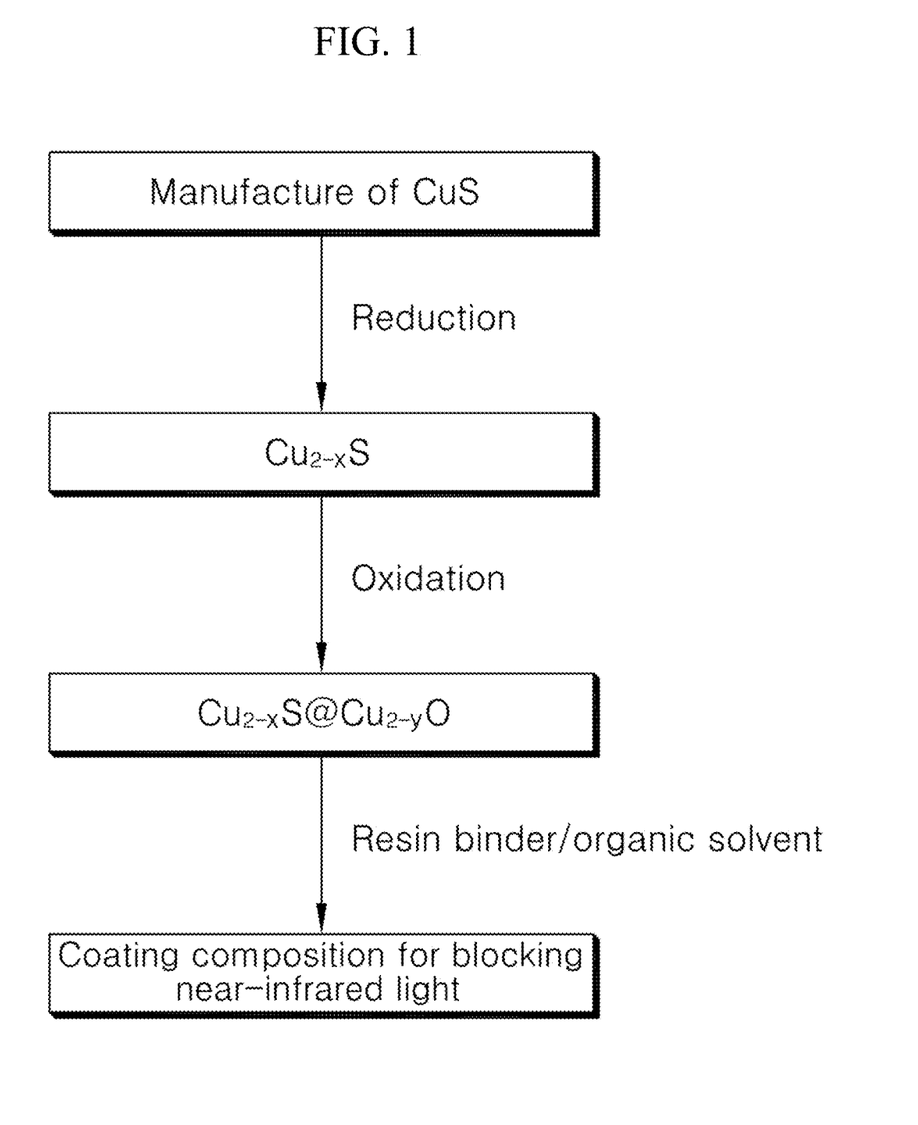
FIG. 1 is a flowchart showing a process of preparing a coating composition for blocking near-infrared light.
Figure 2:
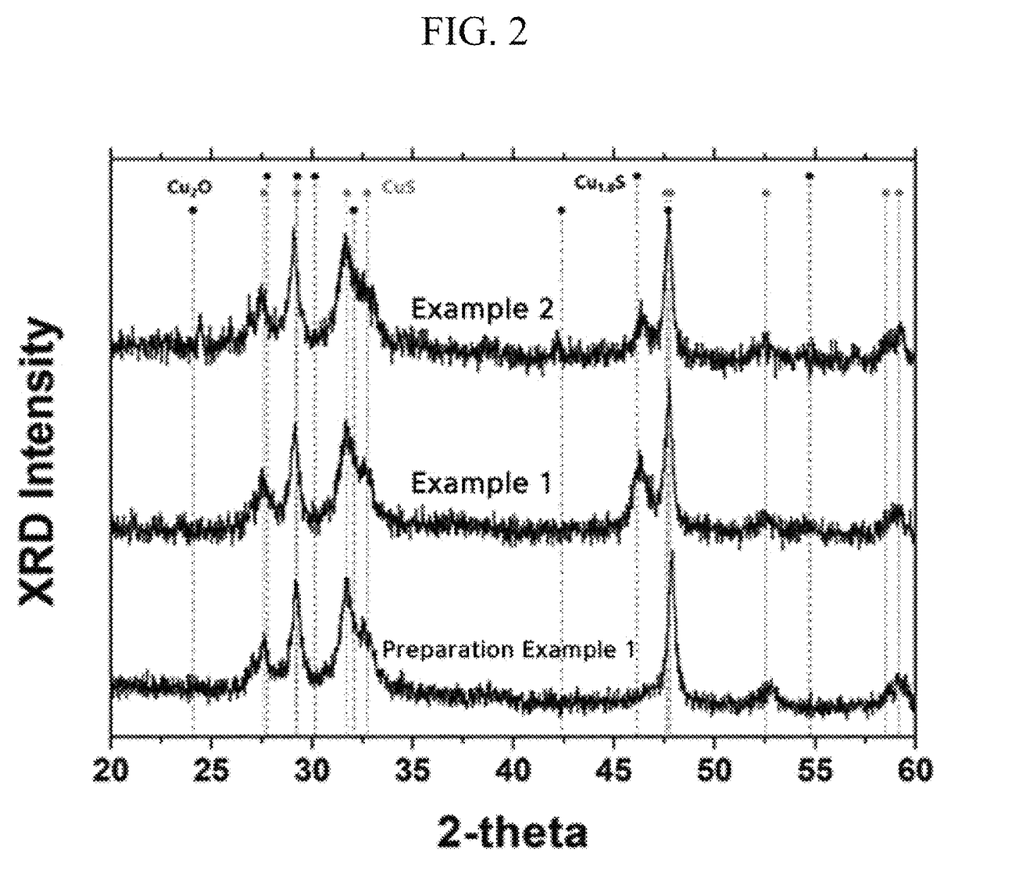
FIG. 2 shows the results of analysis of a crystal structure through X-ray diffraction (XRD) of CuS nanoparticles manufactured in Preparation Example 1, $Cu_{2-x}$ nanoparticles manufactured in Example 1, and $Cu_{2-x}S@Cu_{2-y}O$ nanoparticles manufactured in Example 2.
Figure 3:
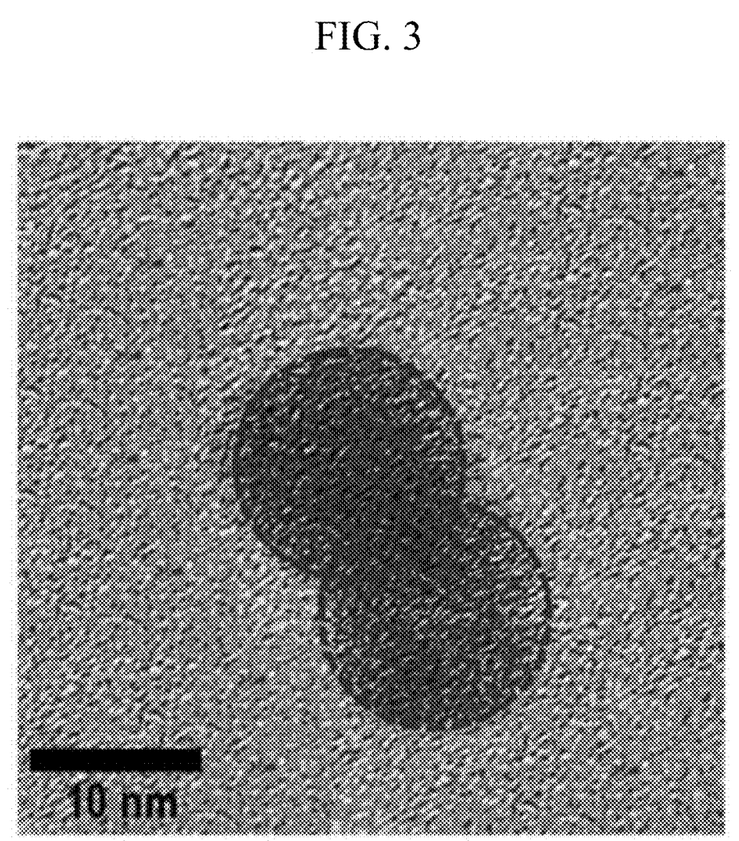
FIG. 3 shows a transmission electron microscope (TEM) image of the nanoparticles manufactured in Example 2.
Figure 4:
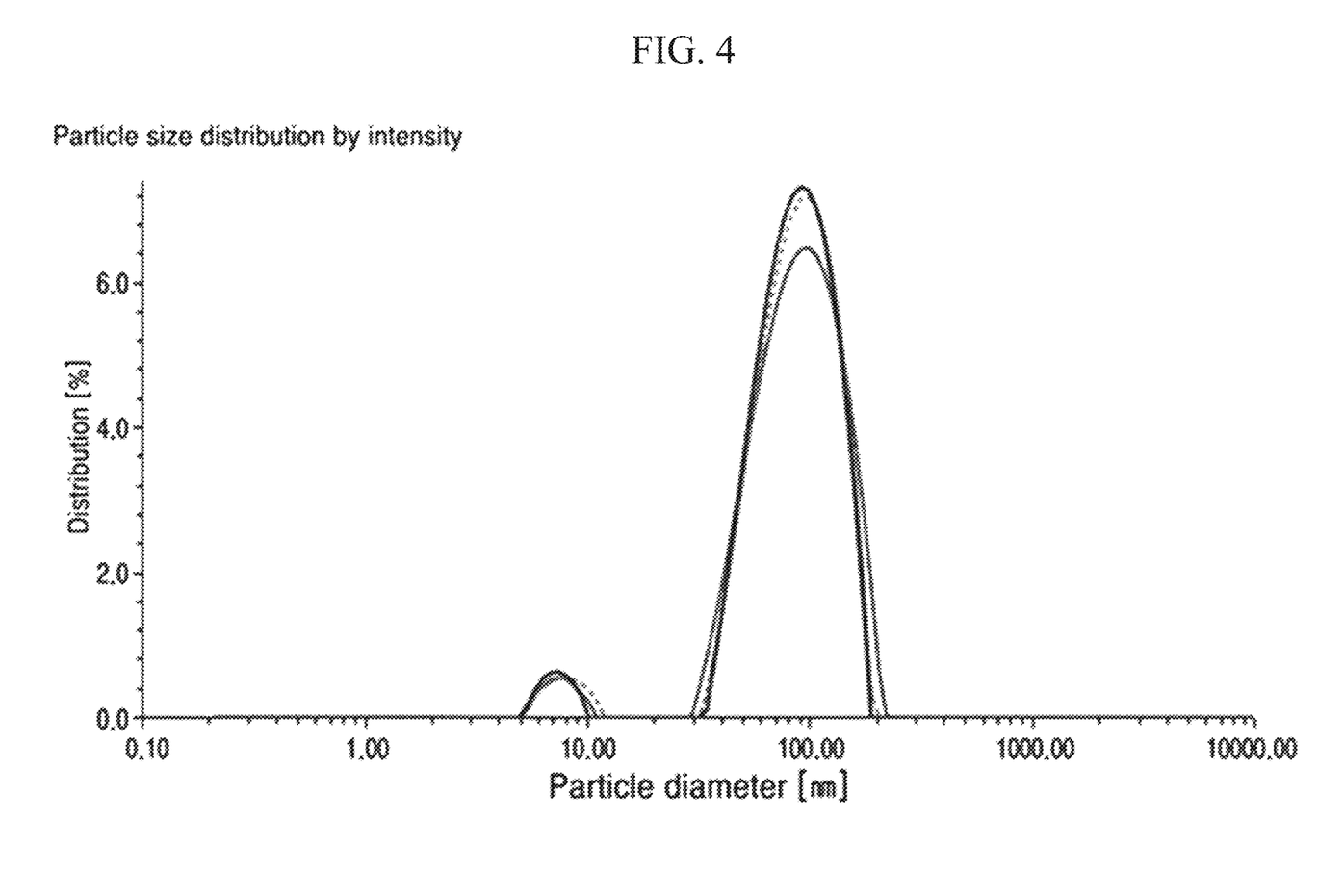
FIG. 4 shows the results of particle size analysis showing the size distribution of the aggregated secondary particles of the nanoparticles manufactured in Example 2.
Figure 5:
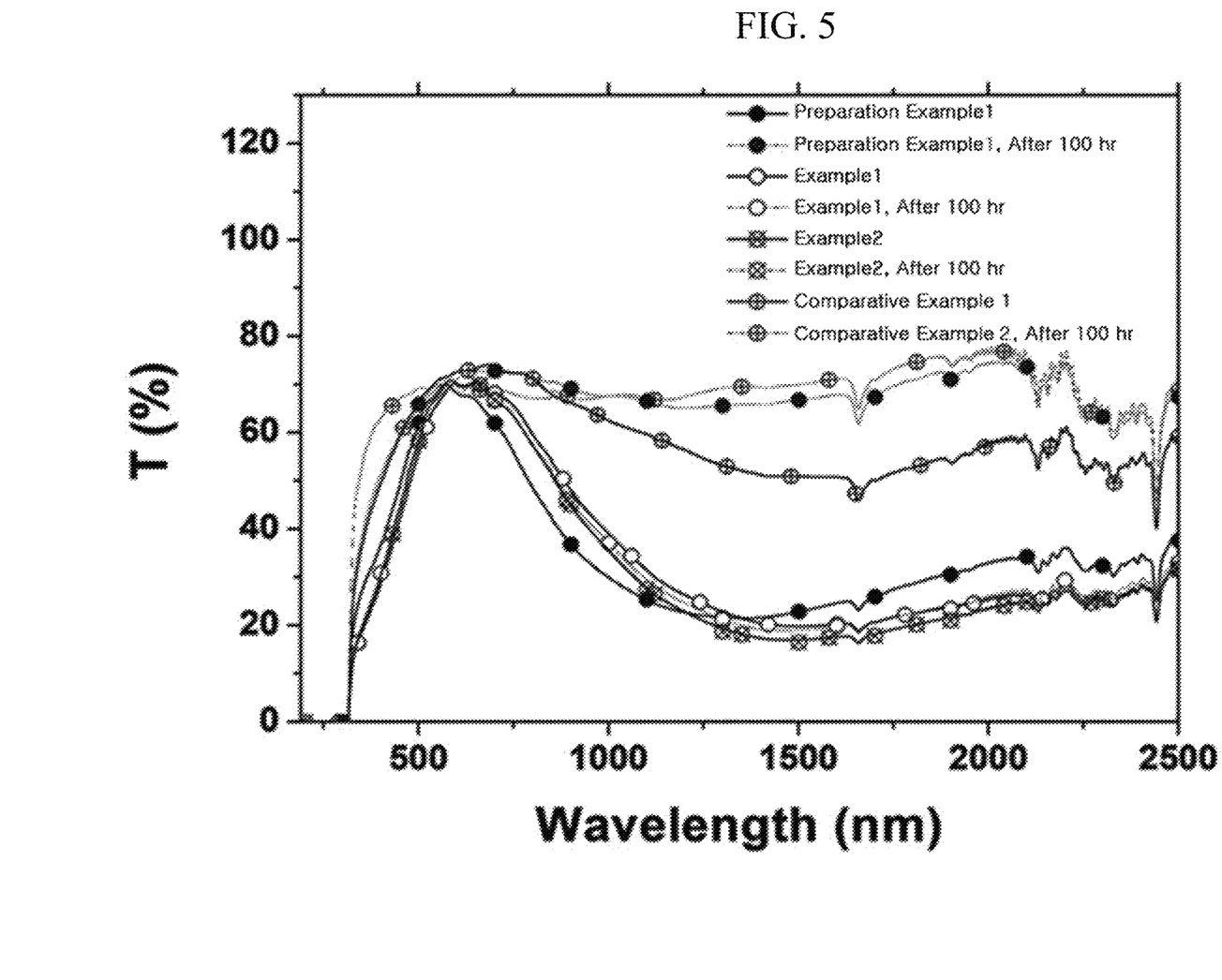
FIG. 5 shows initial transmission spectra and transmission spectra after storage for 100 hours in a thermo-hygrostat chamber (temperature: 85° C., relative humidity: 85%) of coating films including the CuS nanoparticles manufactured in Preparation Example 1, the $Cu_{2-x}$ nanoparticles manufactured in Example 1, and the $Cu_{2-x}S@Cu_{2-y}O$ nanoparticles manufactured in Example 2.

The nanoparticle coating solution was applied on a PET film (SKC V7610, 100 μm) using a #5 MAYER bar. Thereafter, drying was performed for 2 minutes in a convection oven at 80° C., followed by irradiation with UV light at an intensity of 400 mJ/cm², thus manufacturing a film including nanoparticles, of which properties such as visible-light transmittance (VLT), infrared cut (IRC), and haze were then evaluated. In order to evaluate the stability of the manufactured nanoparticles, the nanoparticles were stored for 100 hours in a thermo-hygrostat chamber (temperature: 85° C., relative humidity: 85%) and then evaluated again. The results thereof are shown in Table 2 below and in FIG. 3.

TABLE 2

Initial properties and properties after storage under constant-temperature and constant-humidity conditions of film including nanoparticles

|  | Initial properties | | | After 100 hours under constant-temperature and constant-humidity conditions | | |
| --- | --- | --- | --- | --- | --- | --- |
|  | VLT (%) | IRC (%) | Haze (%) | VLT (%) | IRC (%) | Haze (%) |
| Preparation Example 1 | 58.78 | 70.57 | 1.95 | 67.09 | 32.28 | 18.94 |
| Example 1 | 58.70 | 72.00 | 4.69 | 58.63 | 72.19 | 5.35 |
| Example 2 | 59.28 | 74.34 | 2.70 | 58.99 | 74.51 | 5.37 |
| Comparative Example 1 | 67.40 | 44.07 | 5.13 | 68.01 | 30.40 | 21.46 |

Evaluation of Properties (1) VLT (visible-light transmittance): Using a UV-Vis-NIR spectrometer (Jasco, V670) for the coated film, the average value of the transmittance in the wavelength range of 380 to 780 nm was calculated to determine visible-light transmittance (%).

(2) IRC (infrared cut): Using a UV-Vis-NIR spectrometer (Jasco, V670) for the coated film, the average value of the transmittance in the wavelength range of 780 to 2,500 nm was calculated to determine infrared transmittance (%), after which the infrared cut (%) was obtained by subtracting the infrared transmittance from 100 (%).

(3) Haze: The coated film was measured using a haze meter (NDK, NDH-2000N).

As is apparent from the results of Table 2, the film using the nanoparticles of Comparative Example 1 exhibited the highest visible-light transmittance but a very low near-infrared blocking effect. In Example 2, in which the CuS nanoparticles were reduced and oxidized, the visible-light transmittance was increased, and in particular, the near-infrared cut was the highest, namely 74.34%.

Based on the results of evaluation of stability under constant-temperature and constant-humidity conditions, the film using the CuS nanoparticles of Preparation Example 1 and the film using the CuS@Cu$_{2-y}$O nanoparticles obtained through oxidation of Comparative Example 1 exhibited increased visible-light transmittance, but were remarkably decreased in near-infrared blocking effect. In contrast, the reduced Cu$_{2-x}$S and Cu$_{2-x}$S@Cu$_{2-y}$O had almost no change in the visible-light transmittance, but the near-infrared cut thereof was increased. Briefly, when Cu$_{2-x}$S was formed by reducing CuS, water resistance under conditions of constant temperature and constant humidity was increased and stability in water was ultimately increased.

In particular, it is possible to obtain copper sulfide nanoparticles having a core-shell structure, which are capable of exhibiting improved stability in water while maintaining the superior visible-light transmittance and infrared cut of existing copper sulfide nanoparticles, by forming a dense copper oxide film through the process of converting the surface of Cu$_{2-x}$S into copper oxide. Although the visible-light transmittance and the near-infrared cut vary depending on the amount of copper sulfide nanoparticles in the film and the coating thickness, the film using Cu$_{2-x}$S@Cu$_{2-y}$O manufactured in Example 2 can be confirmed to exhibit a maximum visible-light transmittance of 59.28% and a maximum near-infrared cut of 74.34%. Moreover, the Cu$_{2-x}$S@Cu$_{2-y}$O nanoparticles had superior stability in water and thus exhibited a maximum visible-light transmittance of 58.99% and a maximum near-infrared cut of 74.51% even after 100 hours under constant-temperature and constant-humidity conditions, which are regarded as almost the same level of visible-light transmittance and near-infrared cut as before the constant-temperature and constant-humidity test.

As described hereinbefore, the present disclosure has been described in connection with specified items and predetermined embodiments and drawings, which are merely set forth to provide a better understanding of the present disclosure, and the present disclosure is not limited to the above embodiments, based on which various changes and modifications are possible, as will be apparent to those skilled in the art. Accordingly, the spirit of the present disclosure should not be confined to the disclosed embodiments, but should be defined by all modifications or modified forms derived from the accompanying claims and equivalents thereto.

The invention claimed is:

1. Copper sulfide nanoparticles having a core-shell structure, comprising a core represented by Chemical Formula 1 below and a shell represented by Chemical Formula 2 below:

$$Cu_{2-x}O \quad \text{[Chemical Formula 1]}$$

in Chemical Formula 1, x is greater than 0 and less than 1 for at least a portion of the core; and $$Cu_{2-y}O \quad \text{[Chemical Formula 2]}$$

in Chemical Formula 2, y is greater than 0 and less than 1 for at least a portion of the shell, wherein the copper sulfide nanoparticles having the core-shell structure have a primary particle size of 5 nm to 200 nm and a blocking wavelength range of 600 nm to 2500 nm.

* * * * *